(12) United States Patent
Fish et al.

(10) Patent No.: US 12,460,558 B2
(45) Date of Patent: Nov. 4, 2025

(54) HEAT EXCHANGER HAVING A MIXING CHAMBER AND PROTRUSIONS

(71) Applicant: PRATT & WHITNEY CANADA CORP., Longueuil (CA)

(72) Inventors: Jason Fish, Oakville (CA); Gabriel Naccache, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/649,339

(22) Filed: Apr. 29, 2024

(65) Prior Publication Data

US 2025/0334057 A1 Oct. 30, 2025

(51) Int. Cl.
*F28F 13/12* (2006.01)
*F01D 25/12* (2006.01)

(52) U.S. Cl.
CPC .............. *F01D 25/12* (2013.01); *F28F 13/12* (2013.01); *F05D 2220/323* (2013.01); *F05D 2260/213* (2013.01)

(58) Field of Classification Search
CPC . F01D 25/12; F28F 13/12; F28F 13/02; F28F 1/40; F28F 2009/029; F28F 2210/02; F05D 2220/323; F28D 7/00; F28D 7/10; F28D 7/0075; F28D 2021/0021
See application file for complete search history.

(56) References Cited

U.S. PATENT DOCUMENTS

| | | | |
|---|---|---|---|
| 1,743,989 A | 1/1930 | Charles | |
| 2,230,221 A | 2/1941 | Fitch | |
| 2,731,239 A * | 1/1956 | Andersen | F01P 11/08 244/57 |
| 2,890,722 A | 6/1959 | Loebel et al. | |
| 3,238,902 A * | 3/1966 | Escher | F28D 17/00 110/304 |
| 3,887,004 A * | 6/1975 | Beck | F28F 1/42 165/184 |
| 4,469,169 A * | 9/1984 | Kotwica | F28D 3/04 165/174 |
| 4,784,218 A * | 11/1988 | Holl | F28F 13/02 165/DIG. 405 |
| 5,038,470 A * | 8/1991 | Dierbeck | F28F 13/12 29/469 |
| 5,040,596 A * | 8/1991 | Terasaki | F28F 3/02 165/185 |

(Continued)

*Primary Examiner* — Travis Ruby
(74) *Attorney, Agent, or Firm* — NORTON ROSE FULBRIGHT CANADA LLP

(57) ABSTRACT

A system for an aircraft engine, has: an aircraft component; and a heat exchanger having: a housing defining a first inlet, a first outlet, a second inlet, and a second outlet; first conduits within the housing, the first conduits fluidly connecting the first inlet to the first outlet; one or more second conduit within the housing, the one or more second conduits fluidly connecting the second inlet to the second outlet, the one or more second conduit in heat exchange relationship with the first conduits; a mixing chamber intersecting two or more of the first conduits, the mixing chamber having a peripheral wall extending around a mixing volume and a central axis; and protrusions extending from the peripheral wall into the mixing volume, the protrusions extending around the central axis and across a direction of the flow through the mixing chamber.

19 Claims, 12 Drawing Sheets

(56) References Cited

U.S. PATENT DOCUMENTS

| | | | | |
|---|---|---|---|---|
| 5,193,611 | A | * | 3/1993 | Hesselgreaves .......... F28F 3/02 29/890.039 |
| 5,307,867 | A | * | 5/1994 | Yasuda ................... F28F 13/12 366/338 |
| 6,016,799 | A | | 1/2000 | McNamara |
| 10,976,107 | B2 | * | 4/2021 | Stephens ............... F28D 1/0443 |
| 11,002,497 | B1 | * | 5/2021 | Tiwari ................... F28D 7/106 |
| 11,112,188 | B1 | * | 9/2021 | Ballew ................. F28D 1/0213 |
| 2014/0027102 | A1 | * | 1/2014 | Antel, Jr. .............. F28D 1/0246 165/185 |
| 2015/0252727 | A1 | * | 9/2015 | Aoki ..................... F28D 7/1607 165/51 |
| 2016/0231016 | A1 | * | 8/2016 | Roos ................... F28D 21/0014 |
| 2017/0184028 | A1 | * | 6/2017 | Sennoun ................ F02C 7/224 |
| 2018/0058473 | A1 | * | 3/2018 | Kenworthy ........... F28D 1/0246 |
| 2018/0245853 | A1 | * | 8/2018 | Sennoun ............ F28D 1/05391 |
| 2018/0328285 | A1 | * | 11/2018 | Tajiri ..................... F28F 1/325 |
| 2019/0033016 | A1 | * | 1/2019 | Aoki ................... F28D 9/0037 |
| 2019/0264982 | A1 | * | 8/2019 | Tajiri ................... F28D 7/0008 |
| 2020/0200482 | A1 | * | 6/2020 | Koeune ................ F28D 7/0058 |
| 2021/0239401 | A1 | * | 8/2021 | Erno ....................... F28F 13/02 |
| 2021/0254904 | A1 | * | 8/2021 | Bhaskar .................... F28F 7/02 |
| 2021/0348857 | A1 | * | 11/2021 | Wang ................. H01L 23/3672 |
| 2022/0011049 | A1 | * | 1/2022 | Ingenito ................. F28D 7/106 |
| 2022/0260316 | A1 | * | 8/2022 | Becker ..................... F28F 7/02 |

* cited by examiner

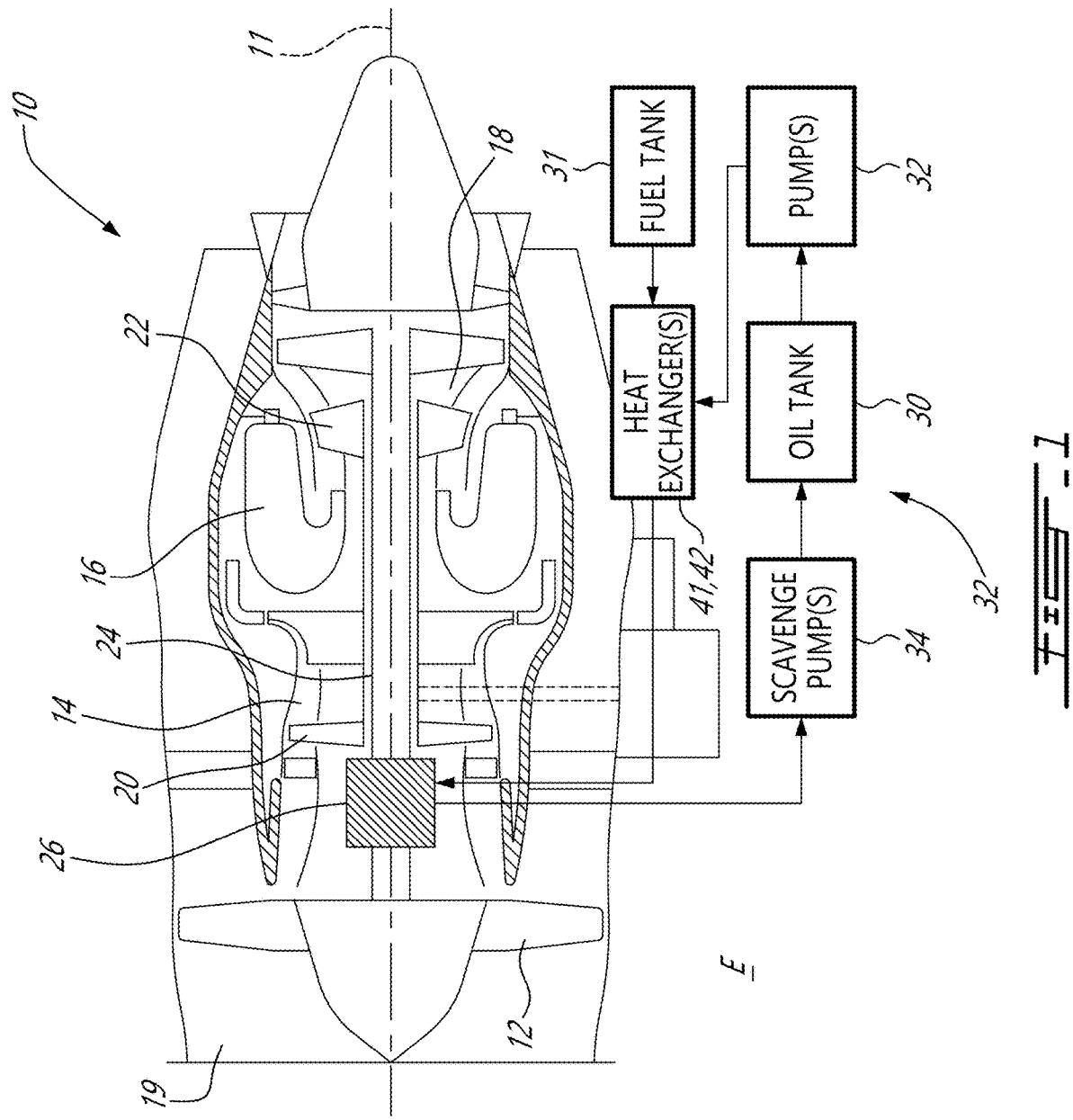

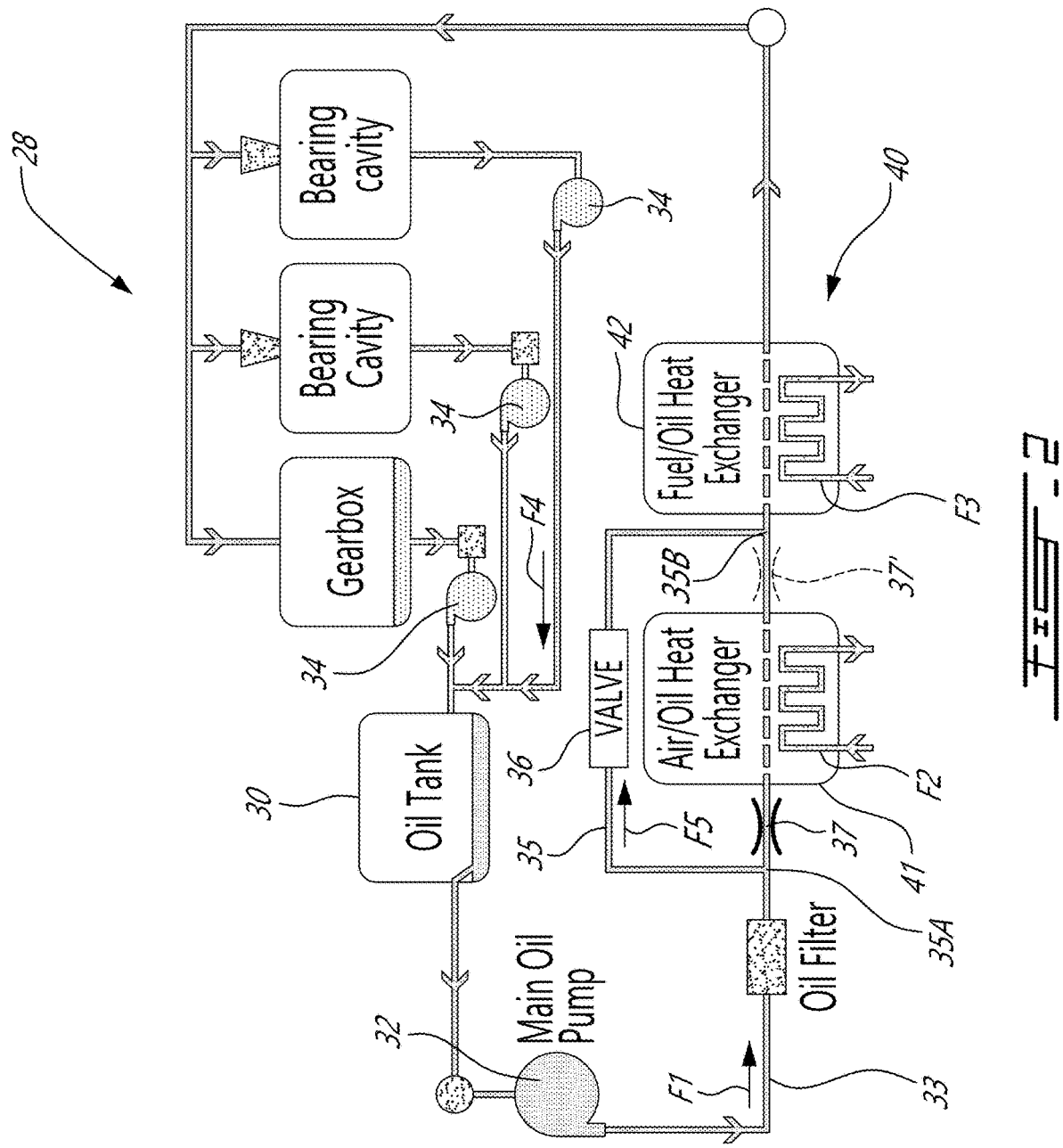

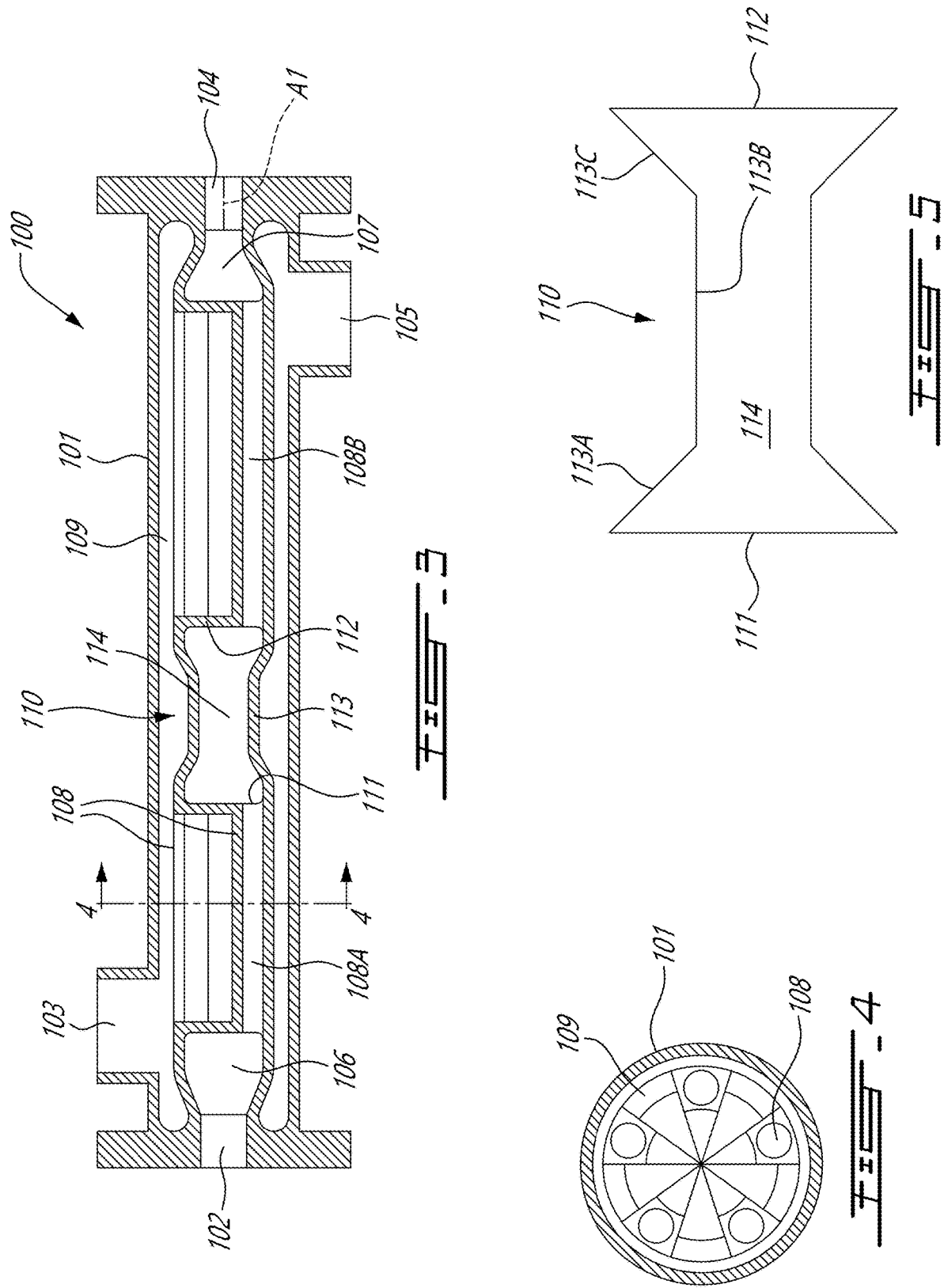

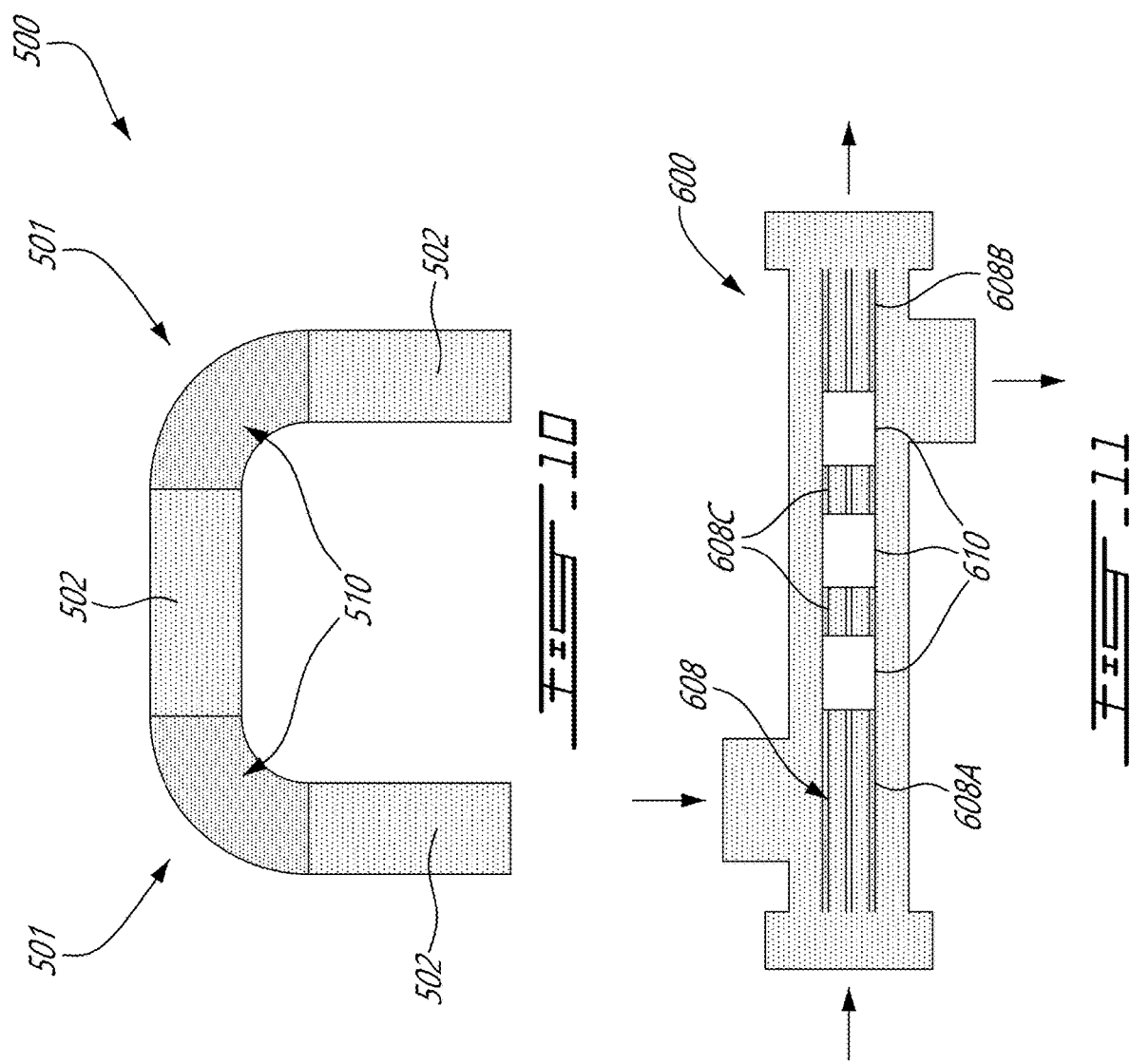

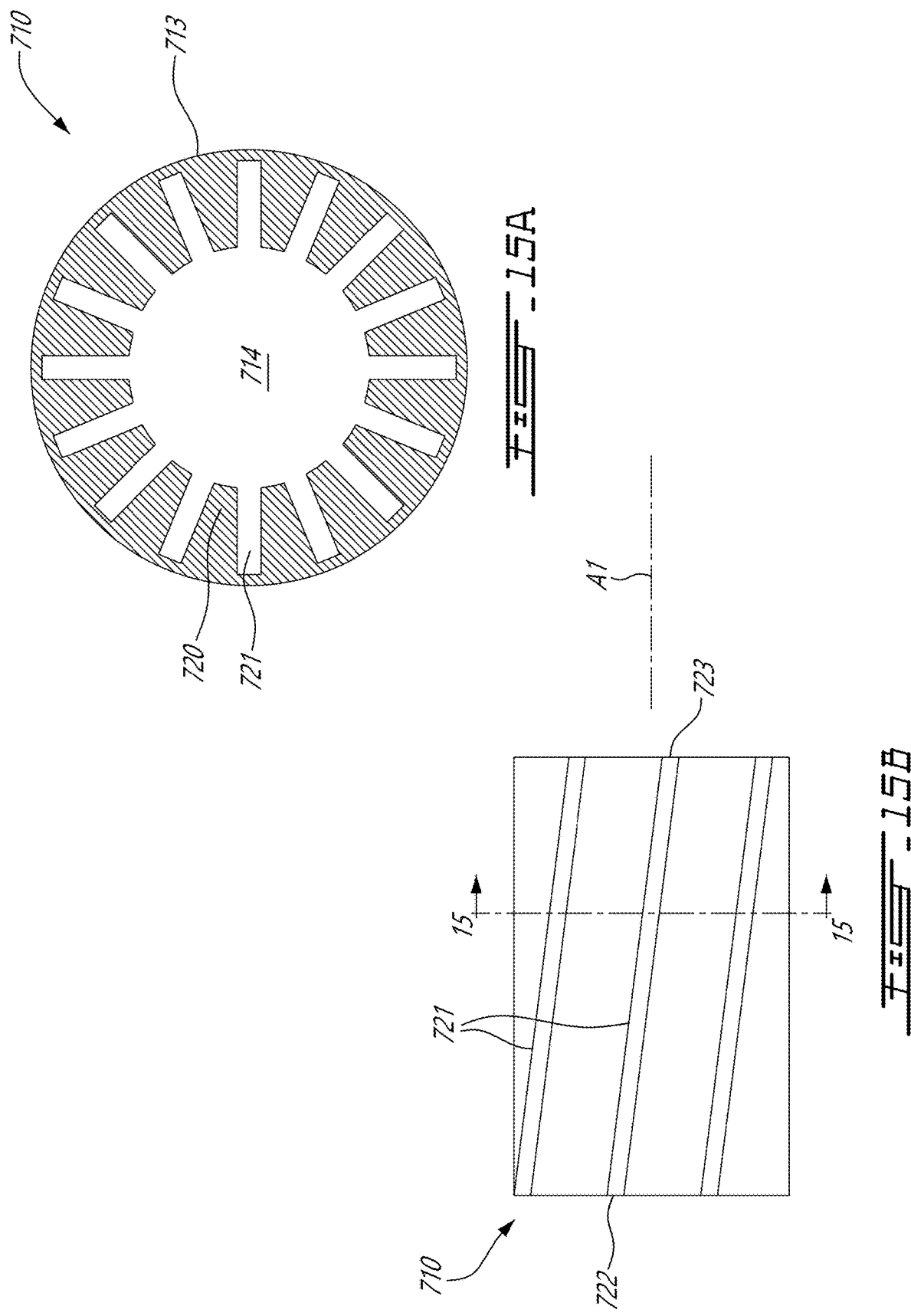

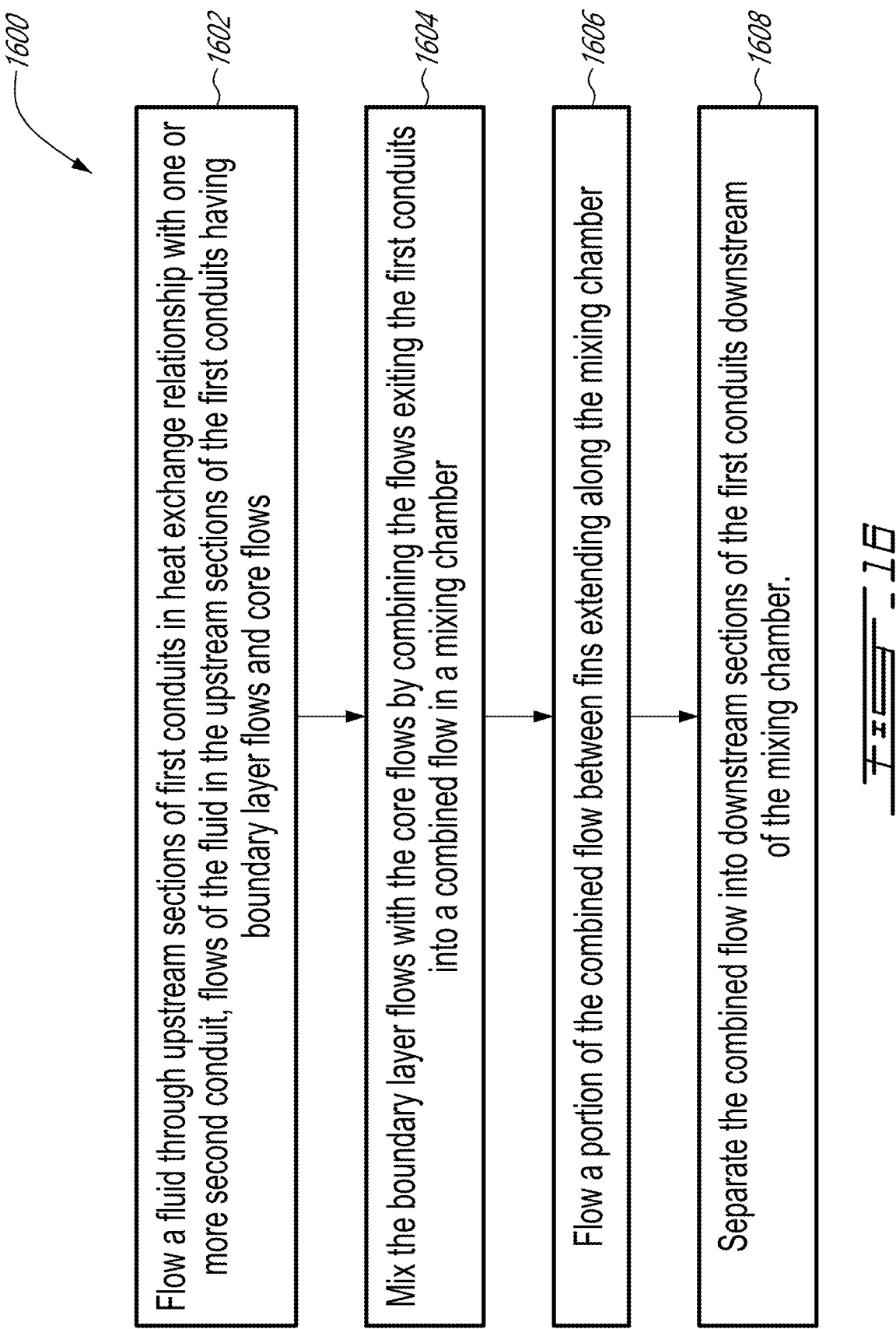

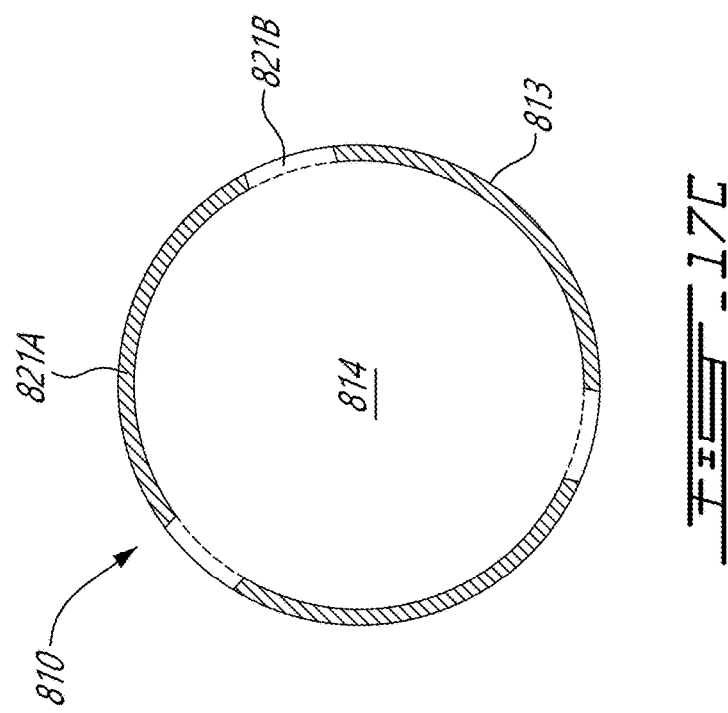
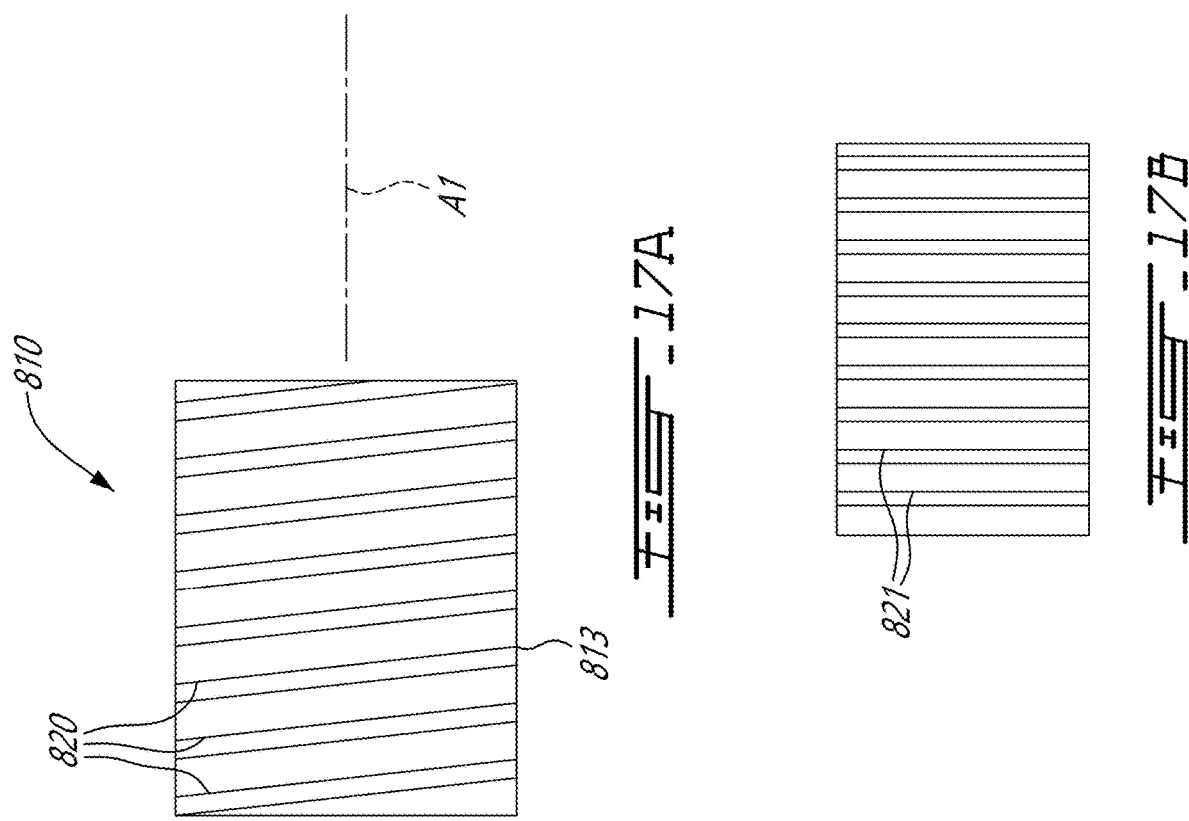

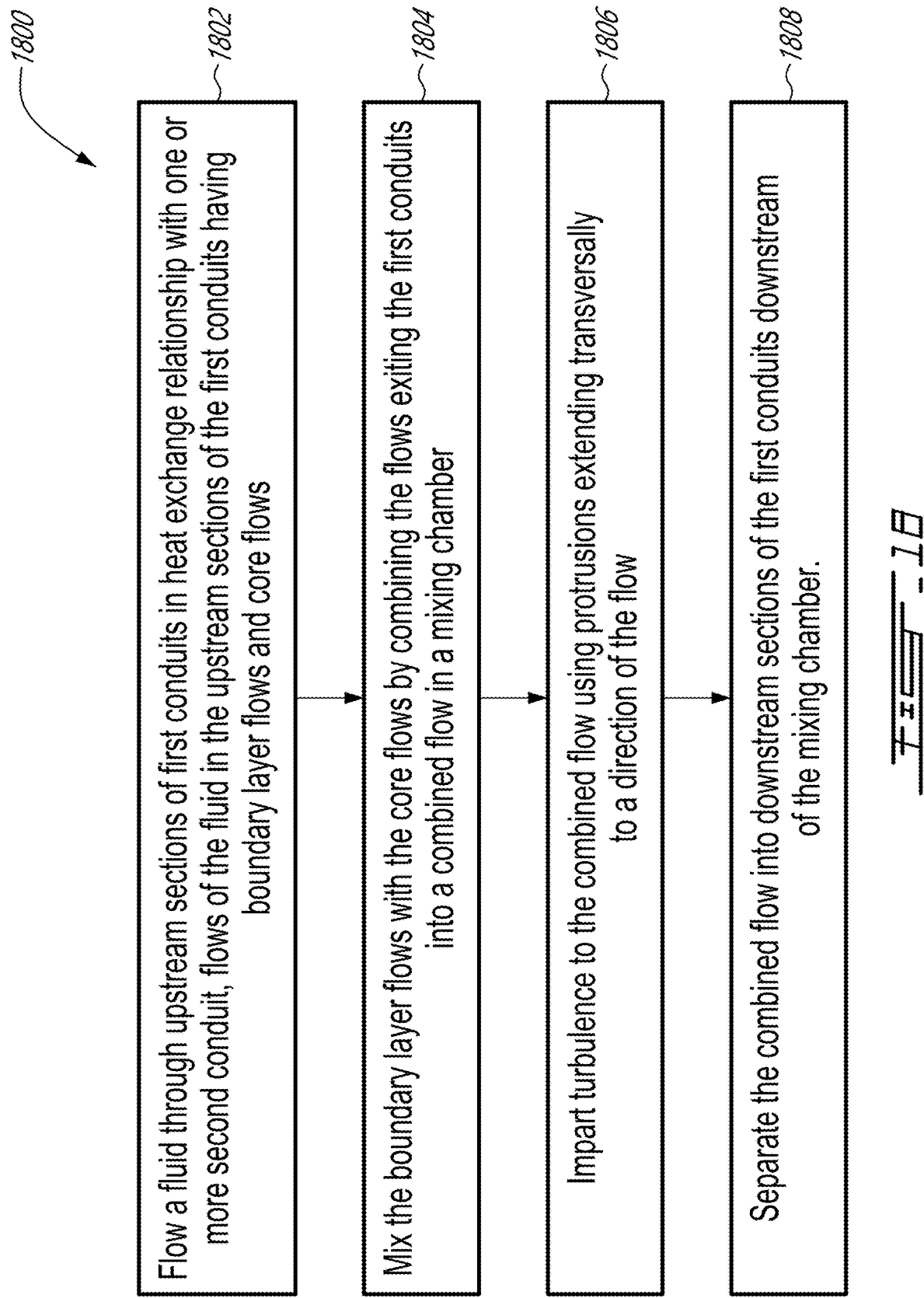

HEAT EXCHANGER HAVING A MIXING CHAMBER AND PROTRUSIONS

TECHNICAL FIELD

The application relates generally to aircraft engines and, more particularly, to heat exchangers used in aircraft engines.

BACKGROUND

A typical aircraft engine has a lubrication system to meet the lubrication and cooling needs of various components of the engine. The lubrication system can deliver oil from an oil tank to the various components within the engine, recover the used oil from the components, and return the recovered used oil back to the oil tank for recirculation. Some aircraft engines can include one or more heat exchangers to remove heat from the oil, or use the oil to exchange heat with another fluid. Various types and configurations of heat exchanger are known in the art. While these known heat exchangers have various benefits, there is still room in the art for improvement.

SUMMARY

In one aspect, there is provided a system for an aircraft engine, comprising: an aircraft component; and a heat exchanger for exchanging heat with a fluid flowing through the aircraft component, the heat exchanger having: a housing defining a first inlet, a first outlet, a second inlet, and a second outlet; first conduits within the housing, the first conduits fluidly connecting the first inlet to the first outlet; one or more second conduit within the housing, the one or more second conduits fluidly connecting the second inlet to the second outlet, the one or more second conduit in heat exchange relationship with the first conduits; a mixing chamber intersecting two or more of the first conduits and separating the first conduits into upstream sections and downstream sections relative to a flow from the first inlet to the first outlet, the mixing chamber having a peripheral wall extending around a mixing volume and a central axis; and protrusions extending from the peripheral wall into the mixing volume, the protrusions extending around the central axis and across a direction of the flow through the mixing chamber.

The system described above may include any of the following features, in any combinations.

In some embodiments, the protrusions extend helicoidally around the mixing volume.

In some embodiments, the protrusions are annular.

In some embodiments, the protrusions include first protrusions distributed around the central axis and second protrusions downstream of the first protrusions and distributed around the central axis.

In some embodiments, the first protrusions are circumferentially offset from the second protrusions.

In some embodiments, the peripheral wall defines a convergent section in which a flow circulating area of the mixing volume decreases in a direction extending from the first inlet to the first outlet.

In some embodiments, the flow circulating area decreases to a reduced flow circulating area in the convergent section, the peripheral wall defining a central section in which the flow circulating area corresponds to the reduced flow circulating area, and a diverging section in which the flow circulating area increases.

In some embodiments, the housing defines an elbow, the mixing chamber located at the elbow.

In some embodiments, the mixing chamber includes an upstream wall secured to the peripheral wall, the upstream sections of the first conduits secured to the upstream wall, the upstream wall defining apertures each fluidly connected to a respective one of the upstream sections of the first conduits, the apertures extending from apertures inlets at an upstream face of the upstream wall to aperture outlets at a downstream face of the upstream wall, the aperture inlets circumferentially offset from the aperture outlets to induce a swirl into a fluid flowing through the apertures.

In some embodiments, the mixing chamber includes a plurality of mixing chambers serially disposed one after the other, the first conduits including intermediate sections interconnecting one of the plurality of mixing chambers to the other.

In another aspect, there is provided an aircraft engine, comprising: a fluid circuit extending from a fluid reservoir of a first fluid to a component of the aircraft engine and back to the fluid reservoir; a source of a second fluid; and a heat exchanger having: first conduits in fluid communication with the fluid circuit and having first conduit inlets and first conduit outlets, the first conduits being in heat exchange relationship with the second fluid; a mixing chamber intersecting the first conduits between the first conduit inlets and the first conduit outlets, the first conduits defining flow paths merging together into the mixing chamber and separating from each other out of the mixing chamber, the mixing chamber having a peripheral wall extending around a mixing volume and a central axis; and protrusions extending from the peripheral wall into the mixing volume, the protrusions extending transversally to the central axis.

The aircraft engine described above may include any of the following features, in any combinations.

In some embodiments, the protrusions extend helicoidally around the mixing volume.

In some embodiments, the protrusions are annular.

In some embodiments, the protrusions include first protrusions distributed around the central axis and second protrusions downstream of the first protrusions and distributed around the central axis.

In some embodiments, the first protrusions are circumferentially offset from the second protrusions.

In some embodiments, the mixing volume includes a central section being devoid of the protrusions.

In some embodiments, the mixing chamber having a convergent section in which a flow circulating area decreases in a direction of the flow.

In some embodiments, the heat exchanger includes a housing containing the first conduits, the heat exchanger defining a second conduit between the first conduits and the housing, the housing defining an elbow, the mixing chamber located at the elbow.

In some embodiments, the mixing chamber includes an upstream wall secured to the peripheral wall, the upstream wall defines apertures each fluidly connected to a respective one of upstream sections of the first conduits, the apertures extending from apertures inlets at an upstream face of the upstream wall to aperture outlets at a downstream face of the upstream wall, the aperture inlets circumferentially offset from the aperture outlets to induce a swirl into a fluid flowing through the apertures.

In yet another aspect, there is provided a method of mitigating loss of heat transfer in a heat exchanger, comprising: flowing a fluid through upstream sections of first conduits in heat exchange relationship with one or more second conduit, flows of the fluid in the upstream sections of the first conduits having boundary layer flows and core flows; mixing the boundary layer flows with the core flows by combining the flows exiting the first conduits into a combined flow in a mixing chamber; imparting turbulence to the combined flow using protrusions extending transversally to a direction of the flow; and separating the combined flow into downstream sections of the first conduits downstream of the mixing chamber.

BRIEF DESCRIPTION OF THE DRAWINGS

Reference is now made to the accompanying figures in which:

FIG. 1 is a schematic cross sectional view of an aircraft engine depicted as a gas turbine engine including an oil cooling system as described herein;

FIG. 2 is a schematic view of an exemplary oil cooling system of the aircraft engine of FIG. 1;

FIG. 3 is a cutaway view of a heat exchanger in accordance with one embodiment, which may be used as part of the oil cooling system of FIG. 2;

FIG. 4 is a cross-sectional view of the heat exchanger of FIG. 3 along line 4-4 on FIG. 3;

FIG. 5 is a schematic cross-sectional view of a mixing chamber of the heat exchanger of FIG. 3 in accordance with one embodiment;

FIG. 10 is a schematic view of a heat exchanger in accordance with another embodiment;

FIG. 11 is a cross-sectional view of a heat exchanger in accordance with another embodiment;

FIG. 15A is a cross-sectional view of a mixing chamber taken along line 15-15 on FIG. 15B, the mixing chamber including fins;

FIG. 15B is a cross-sectional view illustrating the fins of the mixing chamber of FIG. 15;

FIG. 16 is a flowchart illustrating steps of a method of mitigating loss of heat transfer using the heat exchanger of FIG. 3 using the fins of FIGS. 15A and 15B;

FIG. 17A is a cross-sectional view of a mixing chamber in accordance with another embodiment, the mixing chambers including helicoidal protrusions;

FIG. 17B is a cross-sectional view of a mixing chamber in accordance with another embodiment, the mixing chambers including annular protrusions;

FIG. 17C is a cross-sectional view of a mixing chamber in accordance with another embodiment, the mixing chambers including circumferentially-interrupted protrusions; and FIG. 18 is a flowchart illustrating steps of a method of mitigating loss of heat transfer using the heat exchanger of FIG. 3 using the protrusions of FIGS. 17A to 17C.

DETAILED DESCRIPTION

Figure 6:
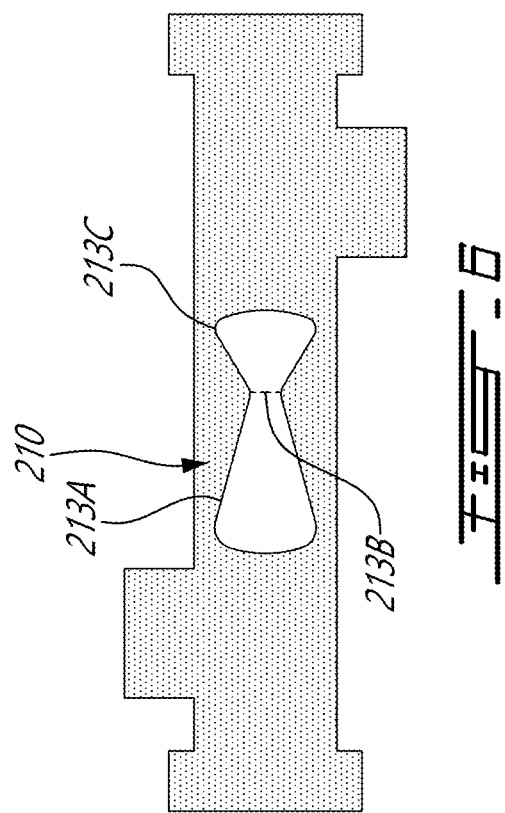
FIG. 6 is a cross-sectional view of a heat exchanger having a mixing chamber in accordance with another embodiment.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the at least one compressor 20 and the at least one turbine 22 being rotatable with a shaft 24 rotatably supported within the gas turbine engine 10 by bearings 26. An oil system 28 is provided for circulating oil to the bearings 26 and back to an oil tank 30. The oil system 28 may service one or more lubrication loads such as bearings and/or gears that require lubrication and/or cooling. It will be appreciated that the principles of the disclosure may apply to any aircraft engines, such as internal combustion engines (e.g., piston engine, rotary engine), any type of gas turbine engines, (e.g., turbofan, turboshaft, and turboprop), and auxiliary power units.

In the embodiment shown, the gas turbine engine 10 has an oil cooling system 40 that is used to exchange heat between different fluids for proper operation of the gas turbine engine 10. In the present case, the oil cooling system 40 includes a first heat exchanger 41, which may be referred to as an air-cooled oil cooler (ACOC), which is used to transfer heat from the oil to an environment E outside the gas turbine engine 10 via a bypass airflow flowing in an annular bypass duct of the gas turbine engine 10. The oil cooling system 40 may further include a second heat exchanger 42, which may be referred to as a fuel-oil heat exchanger (FOHE), used for transferring heat from the oil of the oil system 28 to fuel flowing from a fuel tank 31, or any other fuel source, to the combustor 16 of the gas turbine engine 10 for combustion. Pre-heating the fuel as such may increase efficiency of the combustion of the fuel and may cool down the oil that heats up while lubricating the bearings 26 or other lubrication load(s).

Referring to FIG. 2, the oil system 28 and the oil cooling system 40 are shown in greater detail. The oil system 28 includes an oil pump 32 that drives an oil flow F1 within an oil conduit 33 from the oil tank 30. The oil flow F1 then exchanges heat with an airflow F2 through the first heat exchanger 41, and then exchanges heat with a fuel flow F3 through the second heat exchanger 42. The oil flow F1 is then distributed between different components (lubrication load(s)) in need of oil. In the present embodiment, the oil flow F1 is injected into bearing cavities and a gearbox. Used oil is then scavenged, and scavenge pump(s) 34 drive a scavenge oil flow F4 from scavenge outlets of the bearing cavities and the gearbox back to the oil tank 30 where the oil may be directed back to the oil pump 32 and recirculated. A de-oiler and/or de-aerator may be used to remove air from the scavenge oil flow F4.

The first heat exchanger 41 may be used to transfer heat from the oil flow F1 to the airflow F2. This may decrease a temperature of the oil flow F1. Then, the oil flow F1 may flow through the second heat exchanger 42 where it transfers additional heat to the fuel in order to cool the oil further.

In some heat exchangers, such as the first or second heat exchanger 41, 42, the heat transfer between the two fluids decreases as a length of a conduit in which the fluid flows increases. This may be explained by a growth of the boundary layer along walls of tubes of the heat exchanger. This boundary layer may start acting as an insulator between the cooling medium and the core flow. The boundary layer may thus decrease the efficiency of heat transfer. The inventors of the present disclosure discovered that disturbing the boundary layer may improve heat transfer of the heat exchanger.

Referring now to FIGS. 3-4, a possible embodiment of a heat exchanger is shown at 100. The heat exchanger 100 may be used as the first or second heat exchanger 41, 42 described above, or as a portion of said first or second heat exchanger 41, 42, or any other heat exchanger used in the gas turbine engine of FIG. 1. The heat exchanger 100 may be used in any aircraft engine, such as a rotary engine. The heat exchanger 100 may be used to exchange heat with a fluid flowing through an aircraft component of the aircraft engine. The aircraft component may be, for instance, a bearing cavity, a gearbox, and so on as described above with reference to FIG. 1.

The heat exchanger 100 includes a housing 101 defining a first inlet 102 for receiving a first fluid, a second inlet 103 for receiving a second fluid, a first outlet 104 in fluid communication with the first inlet 102 and for expelling the first fluid, and a second outlet 105 in fluid communication with the second inlet 103 and for expelling the second fluid.

The heat exchanger 100 includes an inlet manifold 106 downstream of the first inlet 102 and an outlet manifold 107 upstream of the first outlet 104 relative to a flow of a first fluid from the first inlet 102 to the first outlet 104. The inlet manifold 106 is fluidly connected to first conduits 108, which fluidly connect the first inlet 102 to the first outlet 104. Put differently, the inlet manifold 106 divides a flow of the first fluid received via the first inlet 102 into a plurality of sub-flows each flowing within a respective one of the first conduits 108 that stem from the inlet manifold 106. These sub-flows are reunited into the outlet manifold 107 before flowing out of the heat exchanger 100 via the first outlet 104. The first conduits 108 are, in this embodiment, contained within the housing 101 and are distributed around a central axis A1 of the heat exchanger 100. Other configurations are contemplated. For instance, the first conduits 108 may be distributed in any way within the housing 101.

The heat exchanger 100 further has a second conduit 109 within the housing, the second conduit fluidly connects the second inlet 103 to the second outlet 105. In the embodiment shown, the second conduit 109 extends between the housing 101 and the first conduits 108 such that outer walls of the first conduits 108 are in contact with a second fluid flowing from the second inlet 103 to the second outlet 105. Thus, the second conduit 109 is in heat exchange relationship with the first conduits 108. However, it will be appreciated that the second conduit 109 may include a plurality of second conduits in an alternate embodiment.

Boundary layer buildup in the first conduits 108 may cause a decrease of the heat transfer along the length of the first conduits 108. To at least partially mitigate this phenomenon, the heat exchanger 100 includes a mixing chamber 110. The mixing chamber 110 intersects the first conduits 108 and separates them in to into upstream sections 108A and downstream sections 108B relative to a flow from the first inlet 102 to the first outlet 104. In the embodiment shown, the first conduits 108 define flow paths merging together into the mixing chamber 110 and separating from each other out of the mixing chamber 110. The mixing chamber 110 may include a plurality of mixing chambers each receiving the sub-flows of two or more of the first conduits 108.

The mixing chamber 110 includes an upstream wall 111, a downstream wall 112, and a peripheral wall 113 that interconnects the upstream wall 111 to the downstream wall 112. The mixing chamber 110 defines a mixing volume 114 enclosed by the upstream wall 111, the downstream wall 112, and the peripheral wall 113. The peripheral wall 113 extends around the mixing volume 114.

Referring to FIG. 5, the peripheral wall 113 of this embodiment includes a convergent section 113A, a central section 113B downstream of the convergent section 113A, and a divergent section 113C downstream of the central section 113B. In the convergent section 113A, a flow circulating area of the mixing volume 114 decreases in a direction extending from the first inlet 102 to the first outlet 104. Stated differently, the flow circulating area decreases in a direction parallel to that of a flow through the mixing chamber 110. The flow circulating area may be taken on a plane normal to the central axis A1. The flow circulating area is defined as an area being perpendicular to a flow direction. In the central section 113B the flow circulating area may remain substantially constant. In the divergent section 113C, the flow circulating area increases up to the downstream wall 112. The central section 113B and the divergent section 113C may be omitted in some configurations. In alternate embodiments described below, the flow circulating area may remain substantially constant along an entirety of the mixing chamber 110.

In the embodiment shown, the convergent section 113A is used to push the flows of the first conduits 108 radially inwardly towards a center of the mixing volume 114. Put differently, the convergent section 113A deviates the trajectory of the flows exiting the first conduits 108 towards the central axis A1. This may further help in mixing the different flows together and may further help in mixing boundary layer flows with core flows. In other words, the flow in each of the first conduits 108 may have a boundary layer flow and a core flow being surrounded by the boundary layer flow. Mixing the boundary layer flows with the core flows in the mixing chamber 110 may mitigate the heat transfer decrease discussed above and may improve an overall heat transfer of the heat exchanger 100. In the central section 113B, the flow circulating area may correspond to a reduced flow circulating area. This reduced flow circulating area may be selected to ensure proper mixing while minimizing pressure drop through the mixing chamber 110. The central section 113B extends from a first location to a second location downstream of the first location. In other words, the central section 113B may have a given length greater than zero.

Referring to FIG. 6, in an alternate embodiment of the mixing chamber referred to at 210, the central section 213B may be punctual. That is, the central section 213B may be a singular throat located at a single location and the flow circulating area is greater than the reduced flow circulating area both immediately upstream and immediately downstream of the single location. In the configuration of FIG. 6, a length of the convergent section 213A may be greater than a length of the divergent section 213C. The greater length of the convergent section compared to that of the divergent section may help increasing mixing. In some embodiments, having the convergent section longer than the divergent section may improve mixing of the core flows with the boundary layer flows.

Figure 7:
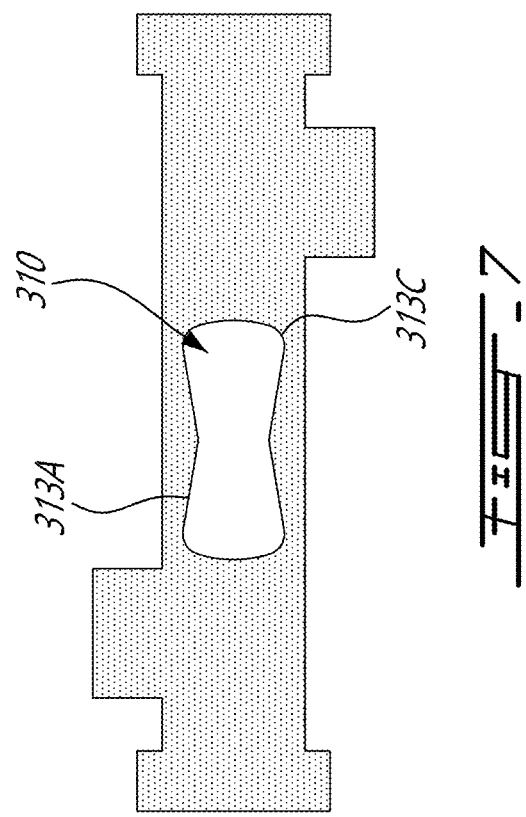
FIG. 7 is a cross-sectional view of a heat exchanger having a mixing chamber in accordance with another embodiment.

Referring to FIG. 7, in an alternate embodiment of the mixing chamber referred to at 310, a length of the convergent section 313A may be equal to a length of the divergent section 313C. This configuration may provide less pressure drop through the mixing chamber 310. In some embodiments, a singular throat may have different loss/mixing characteristics than a configuration having a central section. One may be more advantageous than the other depending on flow velocity through the section.

Figure 8:
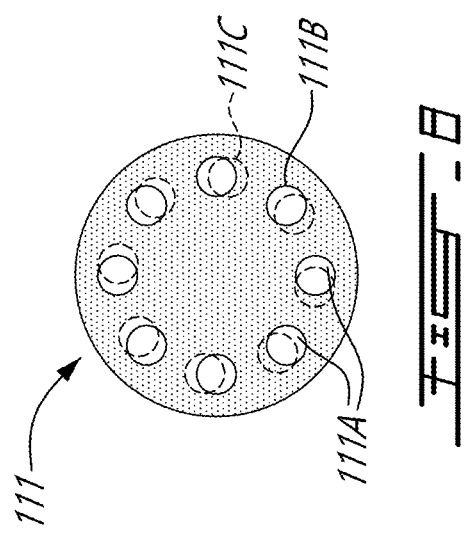
FIG. 8 is a front view of an upstream wall in accordance with one embodiment for the mixing chamber of the heat exchanger of FIG. 3.

Referring to FIGS. 3 and 8, in the disclosed embodiment, the upstream wall 111 defines a plurality of apertures 111A, which are herein rounded (e.g. circular, oval, ellipsoid, etc), each being fluidly connected to a respective one of the first conduits 108. In some embodiments, the apertures 111A may be angled such as to induce a tangential component or a swirl in the flow entering the mixing volume 114. As shown in FIG. 8, the apertures 111A may have aperture inlets 111B shown in solid lines and located at an upstream face of the upstream wall 111 and aperture outlets 111C shown in dashed lines and located at a downstream face of the upstream wall 111. The aperture inlets 111B are offset from the aperture outlets 111C. The offset may be a circumferential offset relative to the central axis A1. The offset may be a combination of circumferential and radial. The offset may be solely radial in some configuration.

Figure 9:
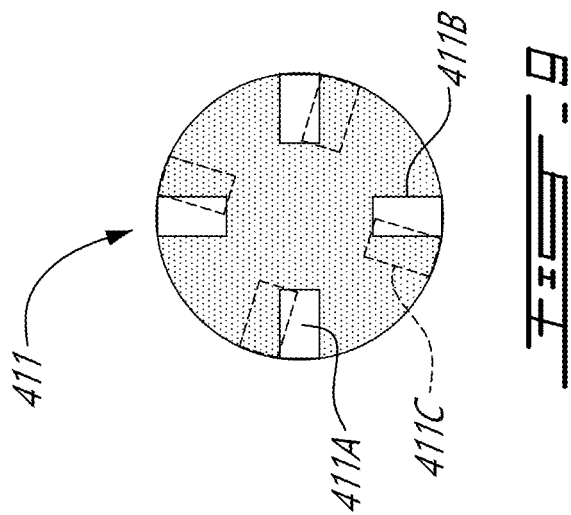
FIG. 9 is a front view of an upstream wall in accordance with another embodiment for the mixing chamber of the heat exchanger of FIG. 3.

Referring to FIG. 9, an alternative embodiment of the upstream wall is shown at 411. The upstream wall includes apertures 411A each fluidly connected to a respective one of the conduits, which may be rectangular in this configuration. The apertures 411A are rectangular in shape, but other shapes, such as square, are contemplated. Similarly to the configuration of FIG. 8, the apertures 411A have aperture inlets 411B and aperture outlets 411C being offset (e.g., circumferentially offset) from one another. In some embodiments, a square or rectangular shape for the apertures has a different surface area and therefore different losses. Such shapes may offer manufacturing advantages as it could be cut rather than drilled.

Referring now to FIG. 10, another embodiment of a heat exchanger is shown at 500. For the sake of conciseness, only features different from the heat exchanger 100 described above with reference to FIG. 3 are described below.

In the embodiment shown, the heat exchanger 500 extends along a curved flow path. Put differently, the heat exchanger 500 defines elbows 501, two in the embodiment shown, but more than two are contemplated. The heat exchanger 500 includes mixing chambers 510, which may each be located at a respective one of the elbows 501. Consequently, the heat exchanger 500 may define a plurality of straight sections 502 interconnected by elbows 501. The first conduits may be located in the straight sections 502. Therefore, in some embodiments, the first conduits may be manufactured by drilling holes through a monolithic piece of material. The length of these holes may be limited by a length of a machining tool. Moreover, it may be challenging to machine curved holes in the elbows 501. To alleviate this drawbacks, the elbows 501 may be devoid of the first conduits and include only the mixing chambers 510. Therefore, it may be possible to have a heat exchanger extending along a curved path without having to drill or machine curved conduits. The mixing chambers 510 may present the advantages of avoiding the necessity to machine curved holes while unexpectedly improving heat transfer efficiency of the heat exchanger 500.

Referring to FIG. 11, another embodiment of a heat exchanger is shown at 600. For the sake of conciseness, only features different from the heat exchanger 100 described above with reference to FIG. 3 are described below.

In the embodiment shown, the heat exchanger 600 includes a plurality of mixing chambers 610 disposed in series one after the other. Although the present configuration includes three mixing chambers, more or less is contemplated. The first conduits 608 include upstream sections 608A and downstream section 608B. The first conduits 608 further includes intermediate sections 608C interconnecting the mixing chambers 610 to one another. Such a configuration may be useful for a long heat exchanger where hole length may be limited by drilling tools.

Figure 12:
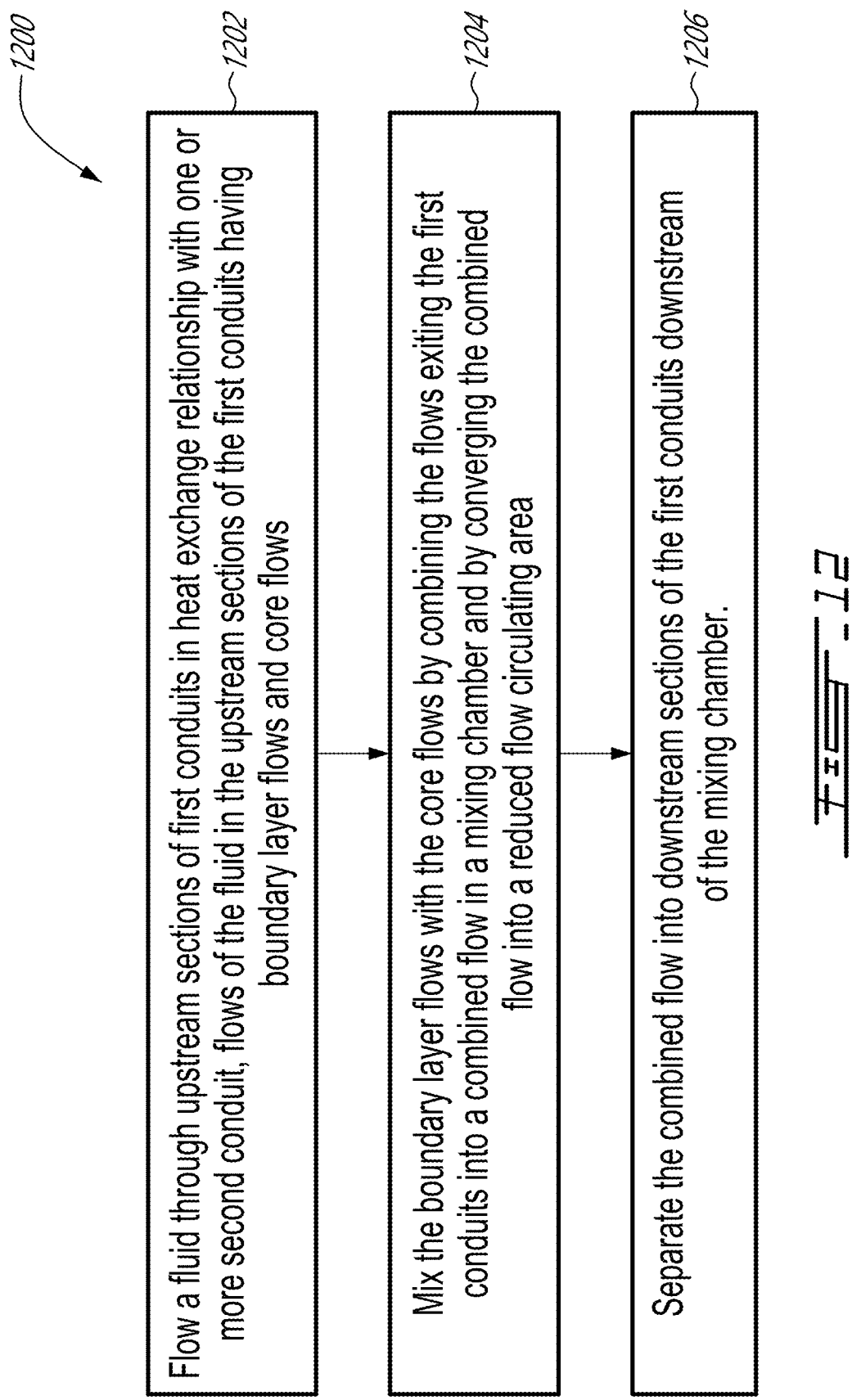
FIG. 12 is a flowchart illustrating steps of a method of mitigating loss of heat transfer using the heat exchanger of FIG. 3.

Referring now to FIG. 12, a method of mitigating loss of heat transfer in a heat exchanger is shown at 1200. The method 1200 includes flowing a fluid through the upstream sections 108A of first conduits 108 in heat exchange relationship with the second conduit 109, flows of the fluid in the upstream sections of the first conduits having boundary layer flows and core flows within the boundary layer flows at 1202; mixing the boundary layer flows with the core flows by combining the flows exiting the upstream sections of the first conduits into a combined flow in the mixing chamber and by converging the combined flow into a reduced flow circulating area at 1204; and separating the combined flow into downstream sections of the first conduits downstream of the mixing chamber at 1206.

In the embodiment shown, the method 1200 may further include inducing a swirl to the flows entering the mixing chamber.

Referring now to FIGS. 13A to 13D, louvers 120 may be mounted to the peripheral wall 113 of the mixing chamber 110. The louvers 120 extend transversally to the central axis A1. Put differently, the louvers 120 extend transversally to a direction of the flow from the upstream sections 108A to the downstream section 108B of the first conduits 108. The expression "transversally" implies that the louvers 120 extend across the flow, and not parallel to it. The louvers 120 may create local constrictions in the flow circulating area along the mixing chamber. The louvers 120 are configured to increase turbulence in the mixing chamber 110 to further increase heat transfer. In some configurations, the louvers may be provided inside the first conduits 108 and/or inside the second conduit 109.

Figure 13B:
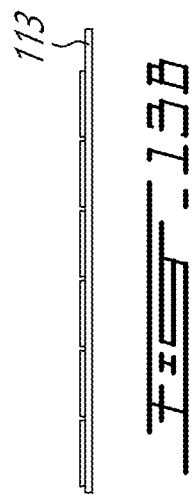
FIGS. 13A to 13D are views of a wall of a mixing chamber in accordance with another embodiment to be used with the heat exchanger of FIG. 3, the wall including louvers shown in a collapsed configuration in FIGS. 13A and 13B and shown in a deployed configuration in FIGS. 13C and 13D.
Figure 13D:
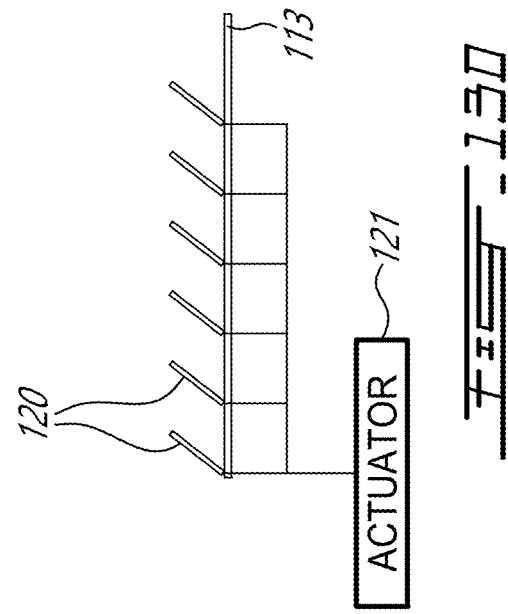
Figure 13A:
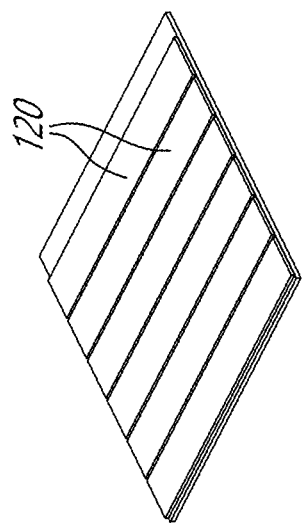
Figure 13C:
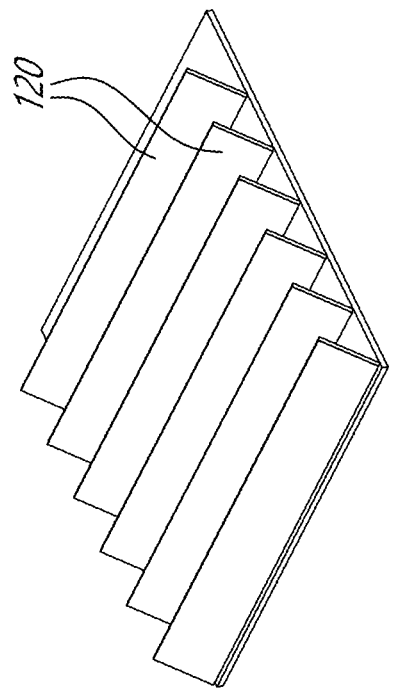

In the embodiment shown, the louvers 120 are movable between a collapsed configuration (FIGS. 13A-13B) and a deployed configuration (FIGS. 13C-13D). In the deployed configuration, the louvers 120 extend at an angle (e.g., 45 degrees) relative to the peripheral wall 113 of the mixing chamber 110 and extend across the mixing volume. Stated otherwise, in the deployed configuration, the louvers 120 extend away from the wall of the mixing chamber 110. In the collapsed configuration, the louvers 120 extend substantially parallel to the peripheral wall 113. The louvers 120 may sit flush with the peripheral wall 113 in the collapsed configuration. The louvers 120 may be spaced apart a distance sufficient to ensure that the flow of the fluid is able to reach spacing between the louvers 120.

As shown in FIG. 13D, an actuator 121 may be drivingly engaged to the louvers 120. Powering the actuator 121 may cause the louvers 120 to pivot between the collapsed and deployed configuration. The actuator 121 may be a single actuator drivingly engaged to teach of the louvers 120 via a unison member. Alternatively, a plurality of actuators each engaged to one or more louvers 120 may be used. Any means able to rotate the louvers 120 are contemplated. The actuator 121 may be a hydraulic actuator, a piezoelectric actuator, a pneumatic actuator, a solenoid and so on. A controller may be operatively connected to the actuator 121 to cause the pivoting of the louvers 120. The controller may receive signal from a sensor, the signal indicative that more heat transfer may be required. The sensor may be, for instance, a flow rate sensor, a temperature sensor, and so on.

In an alternate embodiment, the louvers 120 may be made of a smart-memory alloy. The louvers 120 may be configured to move between the deployed configuration and the collapsed configuration in response to a temperature variation of a fluid flowing through the mixing volume 114.

Smart memory alloys, also known as shape memory alloys (SMAs), are a class of metallic materials that exhibit the unique ability to return to a predetermined shape or size when subjected to changes in temperature. These alloys may be composed of metals like nickel, titanium, and copper.

In the present embodiment, if the heat exchanger 100 is used to cool down a fluid flowing into the first conduits 108 and the mixing chamber 110, the louvers 120 may pivot from the collapsed configuration to the deployed configuration when the temperature of this fluid is above a temperature threshold. The increased turbulence in the mixing chamber 110 may increase heat transfer between the fluid and a second fluid flowing into the second conduit 109. When a temperature of the fluid becomes below the temperature threshold, the louvers 120 may move back to the collapsed configuration to reduce a pressure drop through the heat exchanger 100. As explained above, the use of a smart-memory alloy may provide the louvers 120 with the ability to move by themselves between these two positions as a function of a temperature of the fluid flowing through the mixing chamber 110.

The louvers 120 may promote heat transfer by providing multiple flat plate leading edges with the associated high heat transfer coefficients without increasing flow resistance. The louvers 120 may further contribute in creating an homogenous mixture of the boundary layer and core flows. The louvers 120 may be triangular, rectangular, wavy, offset, perforated, and so on.

Figure 14:
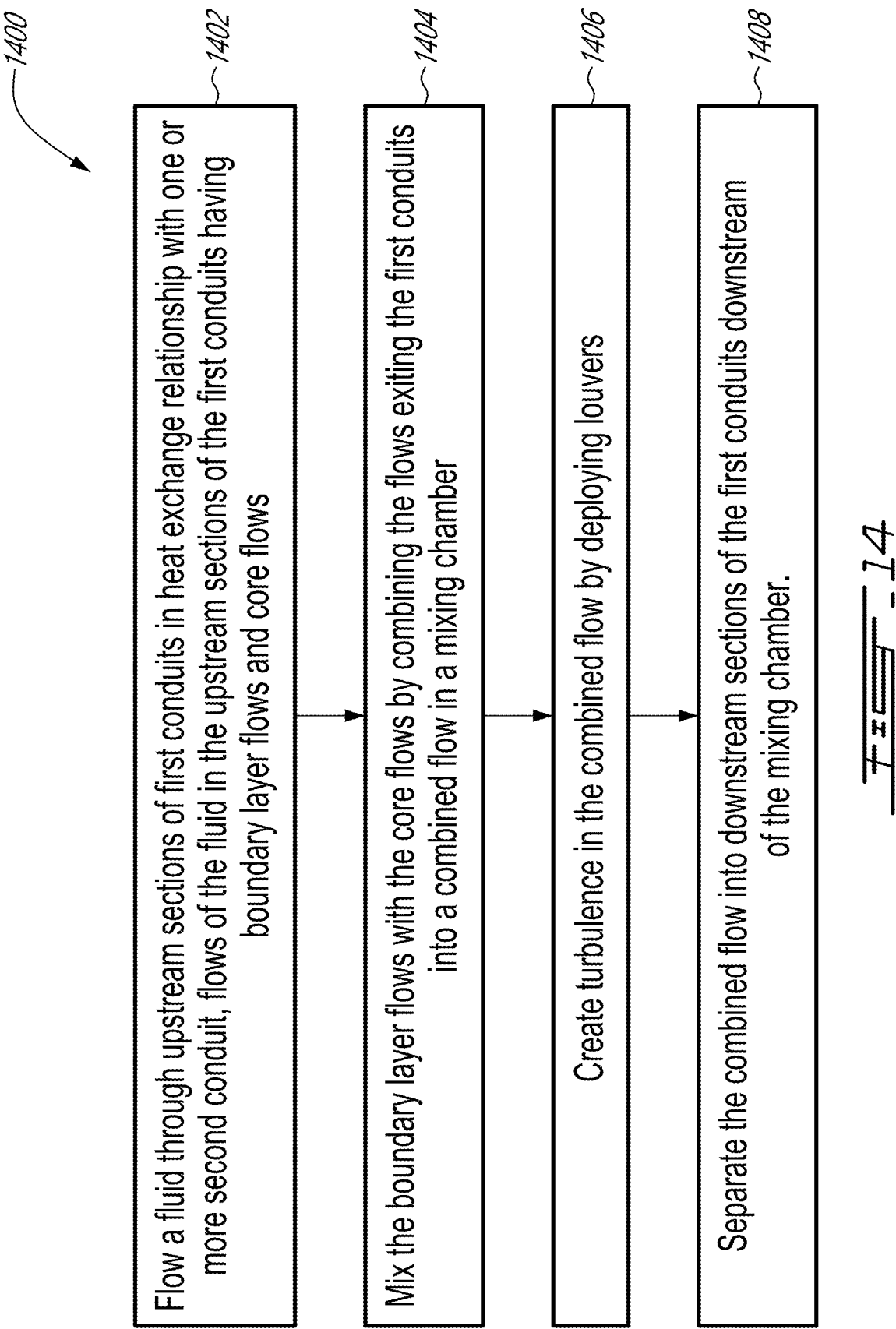
FIG. 14 is a flowchart illustrating steps of a method of mitigating loss of heat transfer using the heat exchanger of FIG. 3 using the louvers of FIGS. 13A to 13D.

Referring to FIG. 14, a method of mitigating loss of heat transfer in a heat exchanger is shown at 1400. The method 1400 includes flowing a fluid through the upstream sections 108A of first conduits 108 in heat exchange relationship with the second conduit 109, flows of the fluid in the upstream sections of the first conduits having boundary layer flows and core flows within the boundary layer flows at 1402; mixing the boundary layer flows with the core flows by combining the flows exiting the upstream sections of the first conduits into a combined flow in a mixing chamber at 1404; creating turbulence in the combined flow by deploying the louvers 120 at 1406; and separating the combined flow into downstream sections of the first conduits downstream of the mixing chamber at 1408.

Referring now to FIGS. 15A and 15B, another embodiment of a mixing chamber is shown at 710 and may be used with the heat exchanger 100 of FIG. 3.

The mixing chamber 710 has a peripheral wall 713, which is substantially cylindrical in this configuration, extending around the central axis A1. The peripheral wall 713 encloses a mixing volume 714. In the embodiment shown, the mixing chamber 710 includes fins 720 protruding from the peripheral wall 713 into the mixing volume 714 towards the central axis A1. The fins 720 extend in a direction having an axial component relative to the central axis A1. The fins 720 extend substantially parallel to a flow direction through the mixing chamber 710. The fins 720 may be said to extend in a direction being mainly axial relative to the central axis A1. In the context of the present disclosure, the expression "mainly" as in "mainly axial" implies that the axial component is greater than the circumferential component.

The fins 720 define flow passages 721 between the fins 720. The fins 720 may extend along a direction being solely axial relative to the central axis A1. However, as depicted in FIG. 15B, in the present embodiment, the fins 720 extend along a direction having an axial component and a circumferential component relative to the central axis A1. An axial component of the direction of the fins 720 may be greater than a circumferential component. The fins 720 may be said to wrap around the mixing volume 714. The fins 720 may extend helicoidally from a first axial end 722 to a second axial end 723 being downstream of the first axial end 722 relative to a direction of the flow through the mixing chamber 710. The fins 720 may extend a full axial length of the mixing chamber 710. Alternatively, the fins 720 may extend only a portion of the length of the mixing chamber 710. The fins 720 may be axially separated in fin sections in some embodiments.

The fins 720 may increase a surface contact area with the fluid flowing in the mixing chamber 710. This may help increasing heat transfer between the two fluids flowing through the heat exchanger 100. The fins 720 may have a trapezoidal shape when seen in a cross-section taken on a plane normal to the central axis A1. Other shapes are contemplated without departing from the scope of the present disclosure.

As shown in FIG. 15A, a central section of the mixing volume 714 is devoid of the fins 720. That is, the fins 720 extend radially to a distal end being radially spaced apart from the central axis A1. The distal ends of the fins 720 are offset from the central axis A1 to maintain a volume free of the fins.

Referring to FIG. 16, a method of mitigating loss of heat transfer in a heat exchanger is shown at 1600. The method 1600 includes flowing a fluid through the upstream sections 108C of first conduits 108 in heat exchange relationship with the second conduit 109, flows of the fluid in the upstream sections of the first conduits having boundary layer flows and core flows within the boundary layer flows at 1602; mixing the boundary layer flows with the core flows by combining the flows exiting the first conduits 108 into a combined flow in the mixing chamber at 1604; flowing a portion of the combined flow between the fins 720 extending along the mixing chamber at 1606; and separating the combined flow into the downstream sections 108B of the first conduits 108 downstream of the mixing chamber at 1608.

Referring now to FIGS. 17A-17B, another embodiment of a mixing chamber is shown at 810. The mixing chamber 810 may be used with the heat exchanger 100 of FIG. 3.

The mixing chamber 810 has a peripheral wall 813 extending around a central axis A1. In the embodiment shown, the mixing chamber 810 includes protrusions 820 extending from the peripheral wall 813 into the mixing volume 814. The protrusions 820 extend transversally to the central axis A1. Put differently, the protrusions 820 extend along a direction having a circumferential component relative to the central axis A1. The protrusions 820 extend across a flow direction of a fluid flowing through the mixing chamber 810 and are configured to induced turbulence to the flow. The protrusions 820 therefore extend in a direction being mainly circumferential relative to the central axis A1. In the context of the present disclosure, the expression "mainly" as in "mainly circumferential" implies that the circumferential component is greater than the axial component. The protrusions 820 extend around the central axis A1 and across a direction of the flow through the mixing chamber.

As shown in FIG. 17A, the protrusions 820 may extend helicoidally around the mixing volume 814. Alternatively, and as shown in FIG. 17B, the protrusions 820' may extend annularly around the central axis A1. In other words, the protrusions 820' may extend solely circumferentially around the central axis A1 and may be devoid of an axial component.

Referring to FIG. 17C, the protrusions 821 may include first protrusions 821A distributed around the central axis A1 and second protrusions 821B distributed around the central axis. The first protrusions 821A may be located at a first axial position and the second protrusions 821B are located at a second axial position downstream of the first axial position. As illustrated, the first protrusions 821A may be circumferentially offset from the second protrusions 821B. Each of the first protrusions 821A may register with a gap defined between two of the second protrusions 821B.

The protrusions 820, 821 may be considered a surface treatment on the peripheral wall 813 to induce turbulence of the fluid flowing through the mixing chamber 810. Typically, these protrusions have a radial depth that may substantially correspond to their axial length. This is different than the fins of FIG. 15A that have a radial depth greater than their circumferential width. The protrusions may include dimples, corrugations, grooves, and so on.

Referring now to FIG. 18, a method of mitigating loss of heat transfer in a heat exchanger is shown at 1800 and includes flowing a fluid through the upstream sections 108A of first conduits 180 in heat exchange relationship with the second conduit 109, flows of the fluid in the upstream sections of the first conduits have boundary layer flows and core flows within the boundary layer flows at 1802; mixing the boundary layer flows with the core flows by combining the flows exiting the upstream sections 108A of the first conduits 108 into a combined flow in a mixing chamber at 1804; imparting turbulence to the combined flow using protrusions extending transversally to a direction of the flow at 1806; and separating the combined flow into downstream sections of the first conduits downstream of the mixing chamber at 1808.

All of the features described above with reference to FIGS. 1-18 may be combined in a single heat exchanger.

The principles of the present disclosure apply to all kinds of heat exchangers such as concurrent flow heat exchangers; countercurrent flow heat exchangers, crossflow heat exchangers, and hybrid flow heat exchangers.

The term "substantially" as used herein may be applied to modify any quantitative representation which could permissibly vary without resulting in a change in the basic function to which it is related.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A system for an aircraft engine, comprising:
an aircraft component; and
a heat exchanger for exchanging heat with a fluid flowing through the aircraft component, the heat exchanger having:

a housing defining a first inlet, a first outlet, a second inlet, and a second outlet;

first conduits within the housing, the first conduits fluidly connecting the first inlet to the first outlet;

one or more second conduit within the housing, the one or more second conduits fluidly connecting the second inlet to the second outlet, the one or more second conduit in heat exchange relationship with the first conduits;

a mixing chamber intersecting two or more of the first conduits and separating the first conduits into upstream sections and downstream sections relative to a flow from the first inlet to the first outlet, the mixing chamber having a peripheral wall extending around a mixing volume and a central axis; and protrusions extending from the peripheral wall into the mixing volume, the protrusions extending around the central axis and across a direction of the flow through the mixing chamber, the protrusions extending along a radial direction relative to the central axis from bases at the peripheral wall to tips without intersecting the central axis, the tips of the protrusions being radially offset from the central axis.

2. The system of claim 1, wherein the protrusions extend helicoidally around the mixing volume.

3. The system of claim 1, wherein the protrusions are annular.

4. The system of claim 1, wherein the protrusions include first protrusions distributed around the central axis and second protrusions downstream of the first protrusions and distributed around the central axis.

5. The system of claim 4, wherein the first protrusions are circumferentially offset from the second protrusions.

6. The system of claim 1, wherein the peripheral wall defines a convergent section in which a flow circulating area of the mixing volume decreases in a direction extending from the first inlet to the first outlet.

7. The system of claim 6, wherein the flow circulating area decreases to a reduced flow circulating area in the convergent section, the peripheral wall defining a central section in which the flow circulating area corresponds to the reduced flow circulating area, and a diverging section in which the flow circulating area increases.

8. The system of claim 1, wherein the housing defines an elbow, the mixing chamber located at the elbow.

9. The system of claim 1, wherein the mixing chamber includes an upstream wall secured to the peripheral wall, the upstream sections of the first conduits secured to the upstream wall, the upstream wall defining apertures each fluidly connected to a respective one of the upstream sections of the first conduits, the apertures extending from apertures inlets at an upstream face of the upstream wall to aperture outlets at a downstream face of the upstream wall, the aperture inlets circumferentially offset from the aperture outlets to induce a swirl into a fluid flowing through the apertures.

10. The system of claim 1, wherein the mixing chamber includes a plurality of mixing chambers serially disposed one after the other, the first conduits including intermediate sections interconnecting one of the plurality of mixing chambers to the other.

11. An aircraft engine, comprising:

a fluid circuit extending from a fluid reservoir of a first fluid to a component of the aircraft engine and back to the fluid reservoir;

a source of a second fluid; and a heat exchanger having:

first conduits in fluid communication with the fluid circuit and having first conduit inlets and first conduit outlets, the first conduits being in heat exchange relationship with the second fluid;

a mixing chamber intersecting the first conduits between the first conduit inlets and the first conduit outlets, the first conduits defining flow paths merging together into the mixing chamber and separating from each other out of the mixing chamber, the mixing chamber having a peripheral wall extending around a mixing volume and a central axis; and protrusions extending from the peripheral wall into the mixing volume, the protrusions extending transversally to the central axis, the protrusions extending along a radial direction relative to the central axis from bases at the peripheral wall to tips, radial distances relative to the central axis from the bases to the tips being less than radial distances relative to the central axis from the bases to the central axis.

12. The aircraft engine of claim 11, wherein the protrusions extend helicoidally around the mixing volume.

13. The aircraft engine of claim 11, wherein the protrusions are annular.

14. The aircraft engine of claim 11, wherein the protrusions include first protrusions distributed around the central axis and second protrusions downstream of the first protrusions and distributed around the central axis.

15. The aircraft engine of claim 14, wherein the first protrusions are circumferentially offset from the second protrusions.

16. The aircraft engine of claim 11, wherein the mixing volume includes a central section being devoid of the protrusions.

17. The aircraft engine of claim 11, wherein the mixing chamber having a convergent section in which a flow circulating area decreases in a direction of the flow.

18. The aircraft engine of claim 11, wherein the heat exchanger includes a housing containing the first conduits, the heat exchanger defining a second conduit between the first conduits and the housing, the housing defining an elbow, the mixing chamber located at the elbow.

19. The aircraft engine of claim 11, wherein the mixing chamber includes an upstream wall secured to the peripheral wall, the upstream wall defines apertures each fluidly connected to a respective one of upstream sections of the first conduits, the apertures extending from apertures inlets at an upstream face of the upstream wall to aperture outlets at a downstream face of the upstream wall, the aperture inlets circumferentially offset from the aperture outlets to induce a swirl into a fluid flowing through the apertures.

* * * * *